United States Patent
Merkel et al.

(10) Patent No.: US 6,454,184 B1
(45) Date of Patent: Sep. 24, 2002

(54) SPRAY NOZZLE FOR A WINDSCREEN WASHER SYSTEM

(75) Inventors: Wilfried Merkel, Kappelrodeck (DE); Roger Daenen, Vlytingen-Riemst (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/719,367

(22) PCT Filed: Mar. 30, 2000

(86) PCT No.: PCT/DE00/00974
§ 371 (c)(1), (2), (4) Date: Jan. 26, 2001

(87) PCT Pub. No.: WO00/61410
PCT Pub. Date: Oct. 19, 2000

(30) Foreign Application Priority Data

Apr. 14, 1999 (DE) .......................................... 199 16 801

(51) Int. Cl.⁷ ................................................. B05B 1/10
(52) U.S. Cl. .............................. 239/284.1; 239/533.13; 239/602
(58) Field of Search ........................ 239/533.13, 284.1, 239/284.2, 602; 137/850, 846, 844, 82

(56) References Cited

U.S. PATENT DOCUMENTS

| | | | | |
|---|---|---|---|---|
| 2,961,168 A | * | 11/1960 | Webb | 239/284.1 |
| 3,173,613 A | * | 3/1965 | Smith | 239/284.1 |
| 3,199,787 A | * | 8/1965 | Oishei et al. | 239/284.1 |
| 3,286,931 A | * | 11/1966 | Webb | 239/284.1 |
| 3,545,682 A | | 12/1970 | Beard | |
| 5,074,471 A | * | 12/1991 | Baumgaten et al. | 239/284.1 |
| 5,865,376 A | | 2/1999 | Krizek | |

FOREIGN PATENT DOCUMENTS

| | | | | |
|---|---|---|---|---|
| DE | 11 06 622 | | 5/1961 | |
| DE | 3709308 | * | 10/1987 | |
| GB | 2274410 | * | 7/1974 | 239/284.1 |
| GB | 2 050 575 A | | 1/1981 | |

* cited by examiner

Primary Examiner—Lesley D. Morris
Assistant Examiner—Dinh Q. Nguyen
(74) Attorney, Agent, or Firm—Michael J. Striker

(57) ABSTRACT

A spray nozzle (10) for a window or glass washing system has a nozzle element (24) in which at least part of a flow conduit (36) is firmed by an elastic hoselike part (26, 28, 30), which closes the flow conduit (36) and under the influence of a washing fluid pressure, widens elastically:and uncovers the conduit (36). The hoselike part (26, 28, 30), with its flow conduit (36), rests tightly in the pressureless state, with an initial tension, on a mandrel (18, 20, 22, 54, 56).

18 Claims, 3 Drawing Sheets

SPRAY NOZZLE FOR A WINDSCREEN WASHER SYSTEM

BACKGROUND OF THE INVENTION

Figure 1:
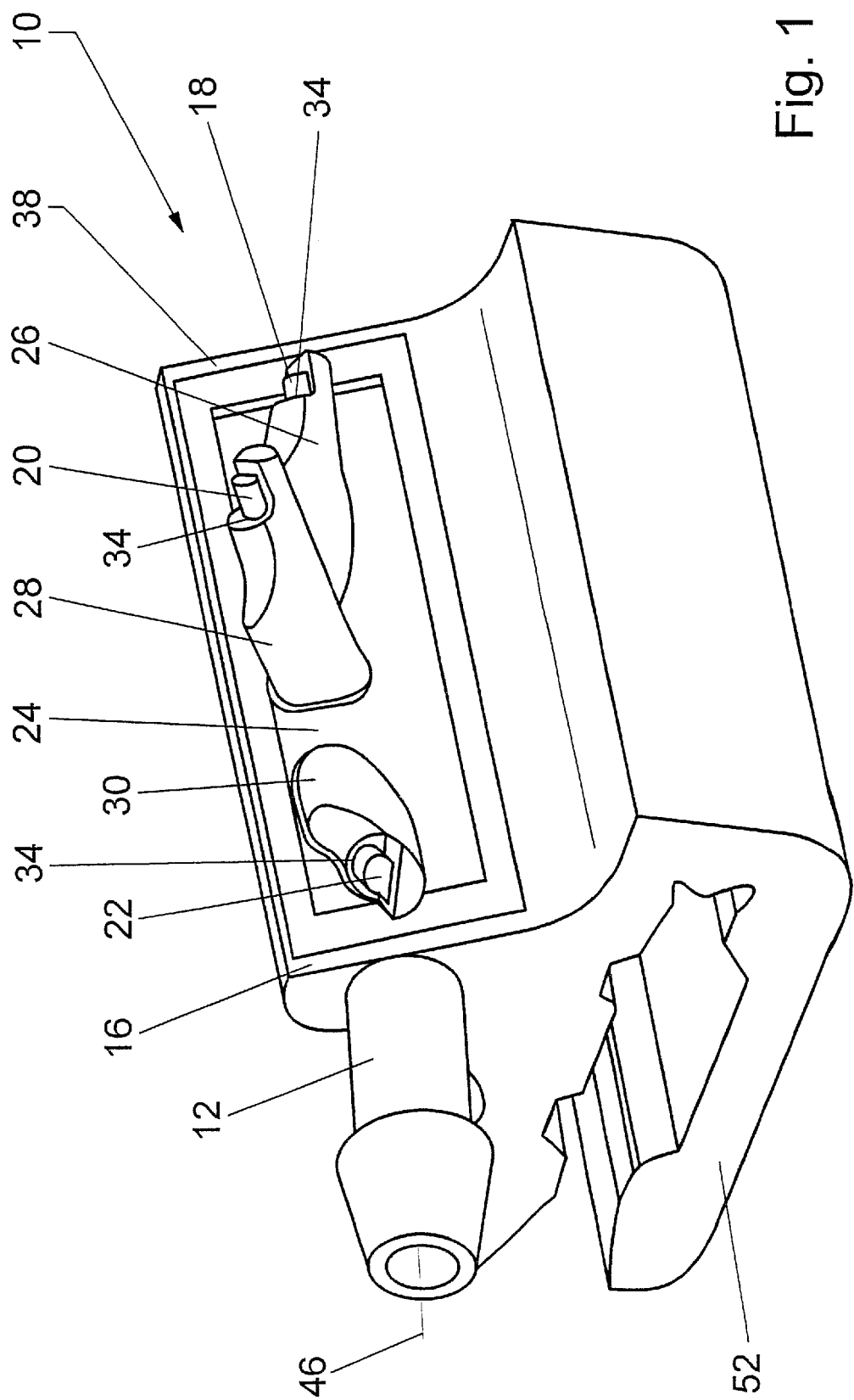
Figure 2:
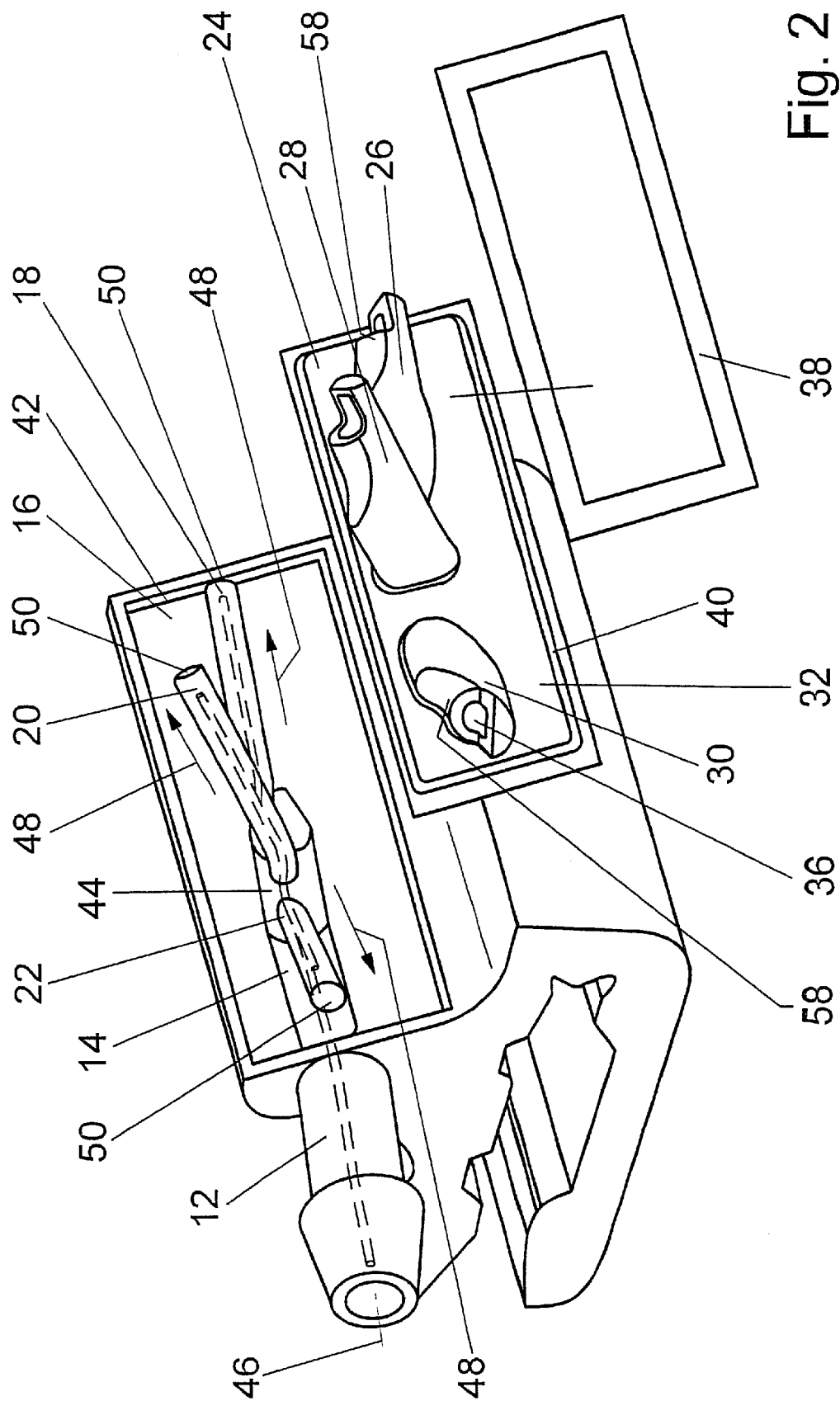
Figure 3:
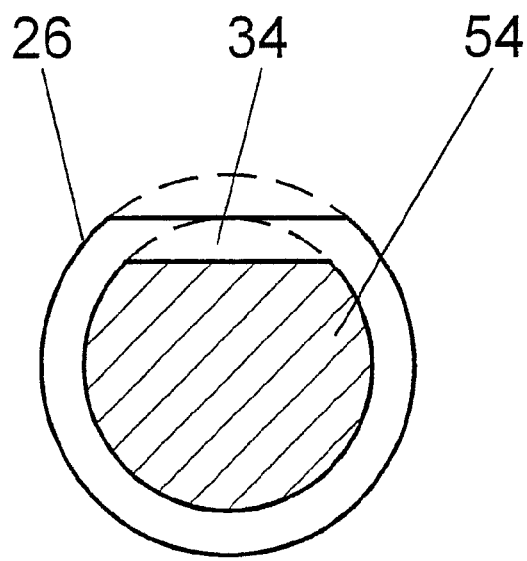
Figure 4:
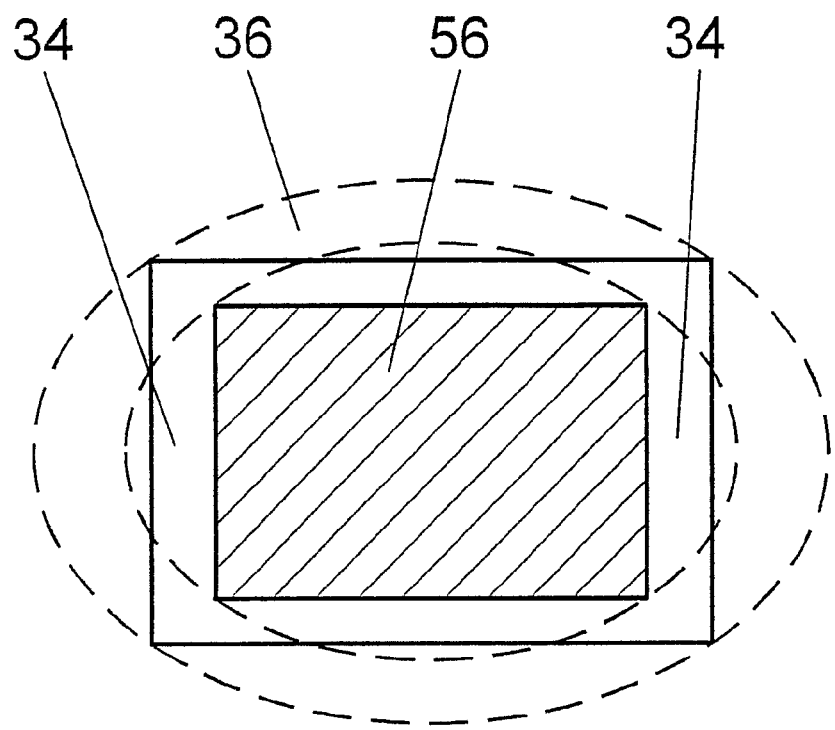

The invention is based on a spray nozzle for a window or glass washing system as generically defined by the preamble to claim 1.

Known window or glass washing systems for vehicles are as a rule used in conjunction with windshield wipers. For headlights, in some cases it suffices to use them without windshield wipers but with a higher pressure. They are actuated if the moisture from precipitation is insufficient to clean the vehicle window. They include a water tank, one or more spray nozzles, and a pump, which pumps water, mixed with cleaning and antifreeze agents under circumstances, with pressure out of the water tank via water lines to the spray nozzles. As a rule, the spray nozzles are secured to a part of a vehicle body, such as a hood, window frame, or the like.

To prevent the spray nozzles from freezing shut at temperatures below the freezing point, heating elements are integrated with the spray nozzles; they are connected to a power supply via plugs located on the outside. The heating elements entail relatively major production effort and expense for the spray nozzles and greater effort of assembly, for laying the electric lines and for contacting the plugs. However, heaters are also known that are passed through a water supply and are embodied as heating coils in the nozzle body.

Furthermore, it is already known to secure spray nozzles to the wiper blade and thus to distribute the spray fluid directly to the wiping region with a short stream length. Since the spray fluid :is concentrated at a region in the vicinity of the wiper blade and is wiped off again in the briefest possible time by the wiping motion, the view is hindered only briefly by the spray fluid applied. A disadvantage of such systems is that weather factors, especially hail and extreme sunshine, have a severe effect on the flexible parts of this arrangement that are needed to span the articulated regions between the wiper arm and the wiper blade. Furthermore, the spray nozzles and water lines, which are exposed to the relative wind, rapidly freeze closed at temperatures below the freezing point, unless enough antifreeze is mixed with the water. As a rule, the frozen water lines and spray nozzles can be thawed again only with great effort.

Expediently, the spray nozzle has an outward opening check valve, which prevents the water line from emptying when the washing system is not in use for relatively long periods. These check valves for the most part operate on the order of a spring and ball system. It is also known, as the nozzle, to use an elastic diaphragm with sealing lips that point outward. This takes on the function of the nozzle and the check valve, because in the pressureless state the sealing lips close, and they open only beyond a certain pressure. As a result, in the pressureless state, the water line remains filled as far as the through opening. The heat transfer from the heating element to the water is unimpeded, and water residues do not become locally overheated and evaporate. As a result, calcium deposits, which over time could plug the narrow conduits in the spray nozzle, are avoided. Furthermore, the highly volatile antifreeze agents stay in the closed spray nozzle, thus assuring optimal protection against freezing. However, it is difficult to attain a certain and in particular relatively high closing pressure, to achieve adequate tightness over the service life, and to keep the spray stream direction, the impact point, and the spray stream geometry within the desired tolerances.

SUMMARY OF THE INVENTION

According to the invention, the hoselike part, with its flow conduit, rests tightly in the pressureless state, with an initial tension, on a mandrel. The initial tension, or prestressing, and thus the opening and closing pressure can be varied, and adapted to the desired conditions, by the oversize of the mandrel compared to the flow conduit, by the elasticity of the hoselike part, or by its wall thickness.

The nozzle element can be provided at an arbitrary point of the window or glass washing system, to prevent washing fluid from flowing in reverse or to prevent emptying of the water lines. However, it can also take on the function of the nozzle at the same time, in that the hoselike part on its end having the mandrel forms a spray hole.

The hoselike part of the nozzle element rests tightly against the mandrel with prestressing, in the pressureless state. Under the influence of a water pressure, the hoselike part of the nozzle element widens, and the washing fluid flows through the flow conduit as it opens to reach the spray hole. Upon shutoff of the pump, the water pressure drops, and an intrinsic tension defined by the geometry and elasticity of the nozzle element closes the flow conduit, so that the mandrel is again tightly surrounded by the hoselike part of the nozzle element.

Because of the initial tension of the hoselike part, in the pressureless state the spray nozzle is sealed off such that in the phases of repose between washing phases, all the components and conduits of the spray nozzle that carry water are closed. As a result, during wiping operation without any washing function, no washing fluid emerges from the spray nozzles, even if they are disposed on wiper arms and if elevated forces of acceleration act on the washing fluid at high wiping frequencies or in the case of stroke-controlled wiper arms. Consequently, less washing fluid is used up. The initial tension of the hoselike part in the state of repose can be designed such that the sealing action is preserved over the service life even if material fatigue occurs.

The direction of the mandrel essentially determines the direction of the spray stream, so that with close tolerances, the impact point of the spray stream on the vehicle window or glass can be predetermined. The geometry of the spray stream is determined largely by the spray hole that forms between the mandrel and the hoselike part when the pressure of the washing fluid exceeds the initial tension. If the mandrel has a circular cross section and if the hoselike part has constant elasticity over its circumference, then an annular gap will form, from which the washing fluid emerges.

To provide that the washing fluid will emerge only at a defined circumferential region of the hoselike part, it is expedient that the hoselike part. is solidly joined over the other region of its circumference to the mandrel, so that in this region no water can escape. Often, it suffices for the hoselike part in this region to have a lesser elasticity and/or a greater wall thickness, so that the gap forms between the mandrel and the hoselike part in the circumferential region having the lesser wall thickness and greater elasticity. For the same flow quantity, a more- compact spray stream will develop under these circumstances.

A further option is. that the hoselike part on at least a portion of its circumference protrudes past the mandrel in the longitudinal direction and is braced on the face end of the mandrel.

The geometry of the spray stream can also be varied by means of the cross section of the mandrel, for instance by providing it with at least one flattened region. This flattened region, which deviates from the circular shape, can be either straight or curved. When a pressure is applied, the hoselike part will initially seek to achieve a circular cross section and will thus form a spray hole toward the flattened region of the mandrel. If there are a plurality of flat faces along the circumference, the spray stream can be distributed over a plurality of circumferential segments. This can be achieved for instance by means of a polygonal cross section of the mandrel. To achieve a concentrated spray stream and at the same time make the mandrel stable, it is expedient for the mandrel to taper toward its end.

In a further feature of the invention, it is proposed that on one nozzle body, a plurality of mandrels are provided, which determine the direction of divergent spray streams and over which the elastic nozzle element is pulled. Thus spray streams in various directions through one spray nozzle can be created; the elasticity of the nozzle element is designed such that it can be installed over the mandrels, which advantageously are solidly connected to the nozzle body. Expediently, the nozzle element has a platelike part, by way of which it is connected to the nozzle body. To that end, the platelike part can be glued or welded to the nozzle body or let into the nozzle body and secured by means of a frame. The frame, which expediently positively engages the inside of the platelike part, reinforces the platelike part so that this part maintains its shape even when pressure is exerted on it. Distributor conduits that connect the hoselike parts to Cone another are advantageously machined into the nozzle body and/or into the platelike part from the parting face between the nozzle body and the platelike part. heating lines can be passed to the inside of the mandrels through the water line and the water conduit. These heating lines are advantageously coextruded into the mandrels during production. If the spray nozzle is secured to a wiper arm, then it is expedient to form a retaining bracket onto the nozzle body.

BRIEF DESCRIPTION OF THE DRAWINGS

Further advantages will become apparent from the ensuing description of the drawings. In the drawing, exemplary embodiments of the invention are shown. The drawing, description and claims include numerous characteristics in combination. One skilled in the art will expediently consider the characteristics individually as well and put them together to make appropriate further combinations.

Shown are:

FIG. 1, a perspective of a spray nozzle according to the invention in the installed state;

FIG. 2, an exploded view of a spray nozzle of FIG. 1:

FIG. 3, a cross section through a mandrel with a flattened profile; and

FIG. 4, a variant of FIG. 3.

DETAILED DESCRIPTION OF THE PREFERRED EMBODIMENTS

A spray nozzle 10 of a window or glass washing system substantially comprises a nozzle body 16 and a nozzle element 24, which has at least one spray hole 34 and functions simultaneously as a nozzle and a check valve (FIG. 1). Via a connection piece 12, the nozzle body 16 is connected to a water line, not shown, of the window or glass washing system. In the nozzle body 16, a water conduit 14 leads from the connection piece 12 to the nozzle element 24. On its end toward the nozzle element 24, the water conduit 14 discharges into a distributor conduit 44 (FIG. 2), which is machined into the nozzle body 16.

Mandrels 18, 20 and 22 are secured or injection-molded onto the nozzle body 16, in the region of the distributor conduit 44, and these mandrels have a circular cross section and point in different directions 48. The nozzle element 24 comprises a platelike part 32, which serves the purpose of fastening to the nozzle body 16, and hoselike parts 26, 28 and 30, which sealingly surround the mandrels 18, 20 and 22. The nozzle element 24 but at least the hoselike parts 26, 28 and 30 are made from a rubber-elastic material.

In the pressureless state, the hoselike parts 26, 28 and 30 rest with prestressing on the mandrels 18, 20 and 22. In the spray operation, washing fluid, at a pressure generated by a pump, passes via the water conduit 14 to reach the mandrels 18, 20 and 22 and bathes them and widens the elastic hoselike parts 26, 28 and 30, so that a flow conduit 36 opens between the mandrels 18, 20 and 22 and the hoselike parts 26, 28 and 30 that surround them. The washing fluid is sprayed onto the vehicle window or glass through the spray holes 34, which are located at the end of the flow conduits 36. As the pressure lessens, a restoring force, determined by the intrinsic tension of the hoselike parts 26, 28 and 30, causes these parts 26, 28 and 30 to contact the mandrels 18, 20 and 22 firmly again, thus closing the flow conduits 36.

The hoselike parts 26, 28 and 30 protrude past the mandrels 18, 20.and 22 in the longitudinal direction 48, over at least part of their circumference, and are braced on the end faces 50 of the mandrels 18, 20 and 22. In another part, the mandrels 18, 20 and 22 protrude out of the hoselike parts 26, 28 and 30 surrounding them and there each forms a respective spray hole 34. The shape of the spray holes 34 is determined by the design of the mandrels 18, 20 and 22. A circular cross section of the mandrels 18, 20 and 22, for instance, results in an annular spray hole 34, while a flattened region on the circumference of the mandrel 54 creates a compact spray hole 34, of the kind shown in dashed lines in FIG. 3. A plurality of flat faces, of the kind present in a mandrel 56 of polygonal cross section, for instance, produce a plurality of spray holes 34 for a multi- stream, optionally fanned-out spray stream (FIG. 4).

Favorable flow conditions for the washing fluid are created if the mandrels 18, 20 and 22 taper toward their end in the longitudinal direction 48. A further possibility of determining the flow conditions and especially the flow direction of the washing fluid is attained by providing that the hoselike parts 26, 28 and 30 have varying elasticity over the circumference of their bearing faces at the mandrels 18, 20 and 22. For instance, the regions 58 of the hoselike parts 26, 28 and 30 having greater elasticity are loosened from the mandrels 18, 20 and 22 earlier by the water pressure. It is also possible to determine the direction of the water by providing that the hoselike parts 26, 28 and 30 are solidly connected to the mandrels 18, 20 and 22 over a circumferential region of the bearing faces of these hoselike parts.

The nozzle element 24 is connected to the nozzle body 16 via the platelike part 32. To that end, the nozzle body 16, on the end of the water conduit 14, has a recess 42 into which the nozzle element 24 is let. The side of the platelike part 32 of the nozzle element 24 facing away from the nozzle body 16 has a groove 40, over its entire circumference, which is engaged positively by a frame 38. The frame 38 firmly retains the nozzle element 24 on the nozzle body 16 by being fitted into the recess 42 as well. In addition, the nozzle element 24 and/or the frame 38 is welded or glued to the nozzle body 16. The distributor conduits 44 can be machined into the nozzle element 24 as well, in the same way as into the nozzle body 16.

For heating the spray nozzle 10, a heating line 46 leads through the water line and the water conduit 14 into the mandrels 18, 20 and 22, so that via the mandrels 18, 20 and 22 and the hoselike parts 26, 28 and 30 surrounding them, the spray nozzle 10 is heated as far as the spray holes 34. Heating the elastic parts assures that even at low ambient temperatures, adequate elasticity of the material still exists. Since the heating line 46 leads through the water supply, the washing fluid is simultaneously heated as well. All the components that carry water are closed by the nozzle element 24 when the spray nozzle 10 is not in operation, so that no residual water can freeze and so that perfect function is assured even at low temperatures. Finally, the nozzle body 16 has a retaining bracket 52, with which it can be clipped to a vehicle part, preferably a wiper arm of a windshield wiper.

What is claimed is:

1. A spray nozzle (10) for a window or glass washing system, comprising: a nozzle element (24) in which at least part of a flow conduit (36) is formed by an elastic hoselike part (26, 28), wherein said hoselike part (26, 28) closes the flow conduit (36) and wherein, under the influence of a washing fluid pressure, said hoselike part (26, 28) widens elastically and uncovers the flow conduit (36), wherein a mandrel is disposed on an end of the hoselike part, wherein the hoselike part (26, 28, 30), with its flow conduit (36), rests tightly in a pressureless state, with an initial tension, on the mandrel (18, 20, 22, 54, 56), wherein the hoselike part (26, 28, 30) on the end having the mandrel (18, 20, 33, 54, 56) forms a spray hole, and wherein, under said washing fluid pressure, the hoselike part is at least partially lifted from the mandrel, thereby allowing a flowthrough of said washing fluid.

2. The spray nozzle (10) of claim 1, wherein the hoselike part (26, 28, 30) has a bearing face at the mandrel, and wherein the hoselike part (26, 28, 30) has a varying elasticity over a circumference of the bearing face at the mandrel (18, 20, 22, 54, 56).

3. The spray nozzle (10) of claim 2, wherein the hoselike part (26, 28, 30) has a wall thickness, and wherein the wall thickness of the hoselike part (26, 28, 30) determines the opening pressure.

4. The spray nozzle (10) of claim 3, wherein the wall thickness of the hoselike part (26, 28, 30) is thinner in one region (58) of its circumference.

5. The spray nozzle (10) of claim 1, wherein the hoselike part (26, 28, 30) has a bearing face at the mandrel, and wherein the hoselike part (26, 28, 30) is solidly connected to the mandrel (18, 20, 22, 53, 56) over a circumferential region of its bearing face at the mandrel (18, 20, 22).

6. The spray nozzle (10) of claim 1, wherein the hoselike part (26, 28, 30) on at least a portion of its circumference protrudes past the mandrel (18, 20, 22, 53, 56) in a longitudinal direction (48) and is braced on a face end (50) of the mandrel (18, 20, 22, 53, 56).

7. The spray nozzle (10) of claim 1, wherein the mandrel (18, 20, 22) has a circular cross section.

8. The spray nozzle (10) of claim 1. wherein a cross section of the mandrel (53, 56) has at least one flattened region.

9. The spray nozzle (10) of claim 1, wherein the mandrel (18, 20, 22, 53, 56) tapers toward one end.

10. The spray nozzle (10) of claim 1, further comprising a nozzle body (16), wherein on the nozzle body (16), a plurality of mandrels (18, 20, 22) are provided, wherein said plurality of mandrels (18, 20, 22) determine the direction of divergent spray streams and wherein the elastic nozzle element (24) is pulled over said plurality of mandrels (18, 20, 22).

11. The spray nozzle (10) of claim 1, further comprising a nozzle body (16), wherein the nozzle element (24) is connected to the nozzle body (18) via a platelike part (32).

12. The spray nozzle (10) of claim 11, wherein the nozzle element (16) a has a recess (42), and wherein the platelike part (32) is let into the nozzle body (16) received in said recess (42).

13. The spray nozzle (10) of claim 11, wherein the platelike part (32) is retained with a frame (38) in the noble body (16).

14. The spray nozzle (10) of claim 13, wherein the platelike part (32) has a groove (40) over an its entire circumference, and wherein the frame (38) positively engages the platelike part (32) in said groove.

15. The spray nozzle (10) of claim 13, wherein the platelike part (32) and/or the frame (38) is welded or glued to the nozzle body (16).

16. The spray nozzle (10) of claim 11, wherein distributor conduits (44) are machined into the platelike part (32) and/or the nozzle body (16).

17. The spray nozzle (10) of claim 1, further comprising a water line and water conduit (14), and wherein a heating line (46) is passed through the water line and the water conduit (14) as far as the inside of the mandrels (18, 20, 22, 53, 56).

18. The spray nozzle (10) of claim 1, further comprising a nozzle body (16), and wherein a retaining bracket (60) is formed onto the nozzle body (16).

* * * * *